United States Patent [19]
Atwood et al.

[11] 3,879,272
[45] Apr. 22, 1975

[54] HYDROMETALLURGICAL PROCESS FOR THE PRODUCTION OF COPPER

[75] Inventors: George E. Atwood; Charles H. Curtis, both of Tucson, Ariz.

[73] Assignee: Duval Corporation, Houston, Tex.

[22] Filed: Jan. 14, 1974

[21] Appl. No.: 433,208

Related U.S. Application Data

[63] Continuation-in-part of Ser. No. 187,393, Oct. 7, 1971, Pat. No. 3,785,944.

[52] U.S. Cl. .................... 204/107; 75/104; 75/114; 75/117; 423/141
[51] Int. Cl. ........................ C22d 1/16; C22b 15/00
[58] Field of Search ...... 204/107; 75/104, 114, 117; 423/140–141

[56] References Cited
UNITED STATES PATENTS
3,785,944  1/1974  Atwood et al. .................... 204/107

Primary Examiner—R. L. Andrews
Attorney, Agent, or Firm—Larry B. Feldcamp; Delmar L. Sroufe

[57] ABSTRACT

A hydrometallurgical process for the recovery of metallic copper from chalcopyrite and other copper-containing materials by ferric chloride oxidation thereof to produce cupric chloride, reduction of the cupric chloride to cuprous chloride, recovery of metallic copper, preferably by electrolysis, and regeneration of ferric chloride by oxidation with concurrent purge of iron, and sulfate ions and other impurities from the process solution. By combining the ferric chloride oxidation and the ferric chloride regeneration, an advantageous reduction in iron content of the process solution is effected along with significant retardation of scaling. The desired chloride molal concentration is maintained by the addition to the process solution of sodium chloride, potassium chloride and/or magnesium chloride. Potassium chloride is a preferred source of chloride ions as a means of purging substantially all sulfate ions from the process solution.

16 Claims, 8 Drawing Figures

REDUCTION STAGE REACTION
SEPARATED OXIDATION-REGENERATION-PURGE

| | Mols | Cl⁻ | % Wt. | Mols | Cl⁻ | % Wt. | Mols | Cl⁻ | % Wt. | Mols | Cl⁻ | % Wt. |
|---|---|---|---|---|---|---|---|---|---|---|---|---|
| | | | | REDUCTION FEED | | | FEED LIQUOR | | | | | |
| Cu | 19.5 | | 4.3 | 19.5 | | 4.48 | 19.5 | | 4.62 | 19.5 | | 4.8 |
| Cl | 19.5 | 39.0 | | 19.5 | 39.0 | | 19.5 | 39.0 | | 19.5 | 39.0 | |
| CuCl₂ | | | | | | | | | | | | |
| Fe | 32.5 | | 6.3 | 32.5 | | 6.53 | 32.5 | | 6.75 | 32.5 | | 7.2 |
| Cl | 32.5 | 65.0 | | 32.5 | 65.0 | | 32.5 | 65.0 | | 32.5 | 65.0 | |
| FeCl₂ | | | | | | | | | | | | |
| Na | 71.0 | | 5.6 | 51.0 | | 4.24 | 36.0 | | 3.08 | 21.0 | | 2.1 |
| Cl | 71.0 | 71.0 | | 51.0 | 51.0 | | 36.0 | 36.0 | | 21.0 | 21.0 | |
| NaCl | | | | | | | | | | | | |
| K | | | | | | | | | | | | |
| Cl | | | | | | | | | | | | |
| KCl | | | | | | | | | | | | |
| Mg | | | | | | | | | | | | |
| Cl | | | | | | | | | | | | |
| MgCl₂ | | | | | | | | | | | | |
| H₂O | 1000.0 | | | 1000.0 | | | 1000.0 | | | 1000.0 | | |
| Tot. Cl | | 175.0 | 22.7 | | 155.0 | 19.85 | | 140.0 | 18.50 | | 125.0 | 17.5 |
| | REDUCTION FEED SOLIDS | | | REDUCTION REACTED LIQUOR | | | | | | | | |
| CuS | 13.0 | | | 13.0 | | | 13.0 | | | 13.0 | | |
| Cu⁺/Cu^Tot | | 97.3 | | | 89.9 | | | 85.2 | | | 76.9 | |
| Tot. Cl | | 172.0 | 20.74 | | 152.0 | 19.09 | | 145.0 | 18.45 | | 127.0 | 16.8 |

REDUCTION STAGE REACTION
COMBINED OXIDATION-REGENERATION-PURGE

| | REDUCTION FEED LIQUOR | | | REDUCTION REACTED LIQUOR | | | OXIDATION FEED LIQUOR | | | REGENERATION REACTED LIQUOR | | | PURGE LIQUOR | | |
|---|---|---|---|---|---|---|---|---|---|---|---|---|---|---|---|
| | Mols | Cl⁻ | % Wt. | Mols | Cl⁻ | % Wt. | Mols | Cl⁻ | % Wt. | Mols | Cl⁻ | % Wt. | Mols | Cl⁻ | % Wt. |
| Cu | 19.5 | | 5.0 | 19.5 | | 4.66 | 19.5 | | 4.48 | 19.5 | | 4.4 | 19.5 | | 4.6 |
| Cl | 19.5 | 39.0 | | 19.5 | 39.0 | | 19.5 | 39.0 | | 19.5 | 39.0 | | 19.5 | 39.0 | |
| CuCl₂ | | | 0.9 | | | 0.838 | | | 0.805 | | | 0.9 | | | 1.0 |
| Fe | 4.0 | | | 4.0 | | | 4.0 | | | 4.0 | | | 4.0 | | |
| Cl | 4.0 | 12.0 | | 4.0 | 12.0 | | 4.0 | 12.0 | | 4.0 | 12.0 | | 4.0 | 12.0 | |
| FeCl₃ | | | | | | | | | | | | | | | |
| Na | 71.0 | | 6.7 | 80.5 | | 6.95 | 80.5 | | 6.63 | 80.5 | | 6.5 | | | |
| Cl | 71.0 | 71.0 | | 80.5 | 80.5 | | 80.5 | 80.5 | | 80.5 | 80.5 | | | | |
| NaCl | | | | | | | | | | | | | | | |
| K | | | | 8.5 | | 1.25 | 23.5 | | 3.32 | 43.5 | | 5.7 | 62.0 | | 5.4 |
| Cl | | | | 8.5 | 8.5 | | 23.5 | 23.5 | | 43.5 | 43.5 | | 62.0 | 124.0 | |
| KCl | | | | | | | | | | | | | | | |
| Mg | | | | | | | | | | | | | | | |
| Cl | | | | | | | | | | | | | | | |
| MgCl₂ | | | | | | | | | | | | | | | |
| H₂O | 1000.0 | | | 1000.0 | | | 1000.0 | | | 1000.0 | | | 1000.0 | | |
| Total Cl | | 122.0 | 17.3 | | 140.0 | 18.70 | | 155.0 | 19.85 | | 175.0 | 21.6 | | 175.0 | 23.0 |
| CuS | 14.3 | | | 14.3 | | | 14.3 | | | 14.3 | | | 14.3 | | |
| Cu⁺/Cu Tot | | | 75.0 | | | 89.3 | | | 96.0 | | | 99.7 | | | 98.0 |
| Total Cl | 123.0 | | 16.6 | 139.0 | | 17.76 | 155.0 | | 19.10 | 174.0 | | 20.5 | 170.0 | | 21.65 |

REDUCTION STAGE
REACTED LIQUOR

―――――― COMBINED OXIDATION AND REGENERATION-PURGE

― ― ― ― SEPARATE OXIDATION AND REGENERATION-PURGE

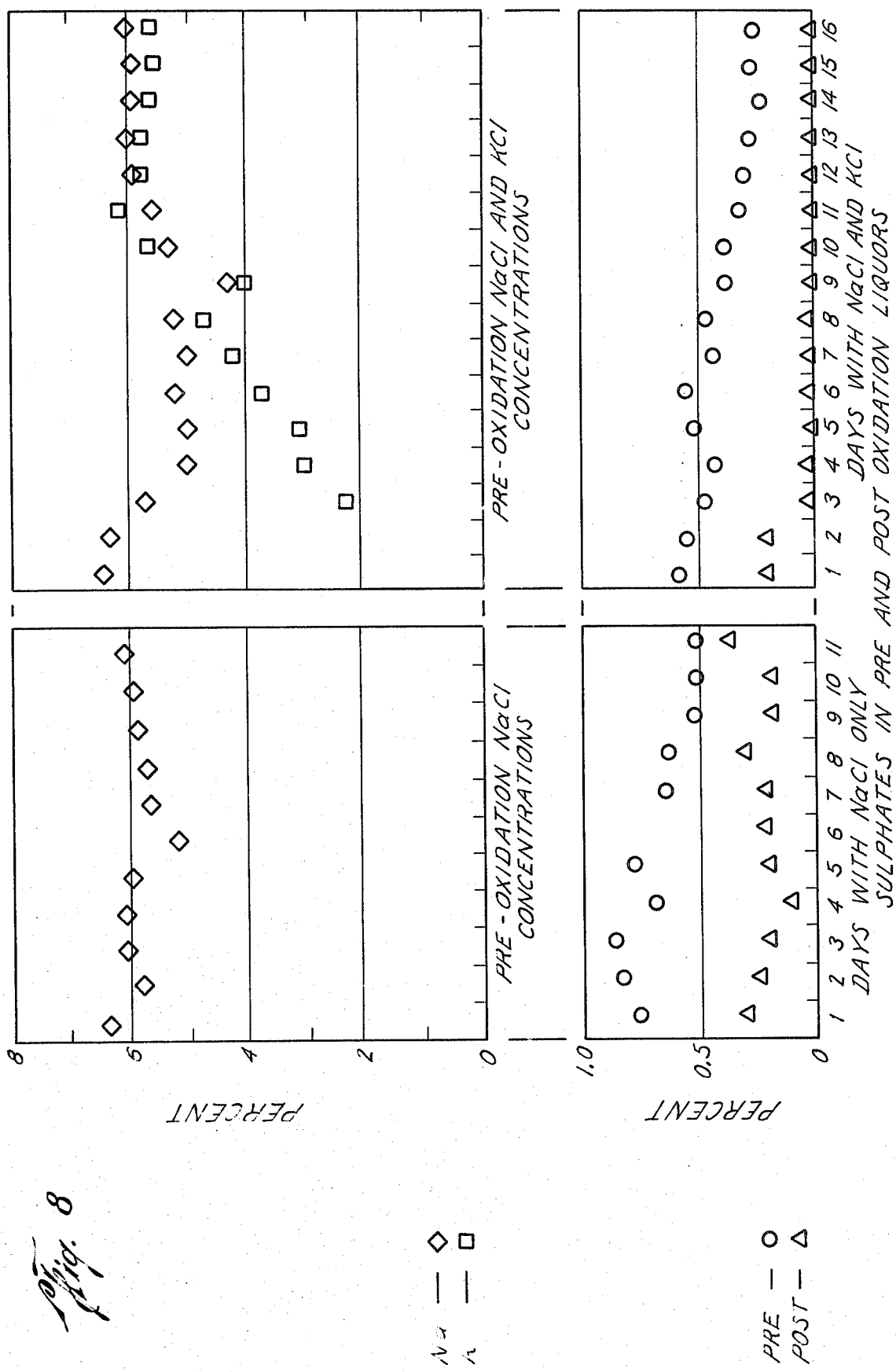

HYDROMETALLURGICAL PROCESS FOR THE PRODUCTION OF COPPER

CROSS-REFERENCES TO RELATED APPLICATONS

This application is a continuation-in-part of copending application Ser. No. 187,393, filed Oct. 7, 1971, now U.S. Pat. No. 3,785,944.

BACKGROUND OF THE INVENTION

This invention relates generally to an improved hydrometallurgical process for the production of metallic copper from copper-containing materials. In particular, this improvement is concerned with the metal chloride processing of copper sulfide ore concentrates.

In application Ser. No. 187,393, a copper hydrometallurgical process was described for processing copper sulfide ore concentrates, especially those containing chalcopyrite. This process has four basic stages: an oxidation stage in which copper-containing materials are oxidized with a solution containing ferric chloride and cupric chloride to form a solution containing ferrous chloride and additional amounts of cypric chloride; a reduction stage in which the cupric chloride in the solution from the oxidation stage is reduced to cuprous chloride, primarily by the use of fresh copper sulfide ores; a copper recovery stage in which metallic copper is recovered from the cuprous chloride solution, preferably by electrolysis; and a regeneration-purge stage in which ferric chloride is regenerated by oxidation with concurrent purge of excess iron as well as sulfate ions and other impurities.

The continuing innovative development of the process of this invention has resulted in the discovery of additional information together with alternative operating procedures and conditions which enhance the advantages provided by the basic process disclosed in our copending application.

SUMMARY OF THE INVENTION

An object of the present invention is to provide an improved hydrometallurgical process for the recovery of valuable constituents including copper from copper-containing materials which achieves essentially complete dissolution of the contained copper, production of electrolytic grade metallic copper, regeneration of the reagents and removal of impurities from the process solution.

Another object is to provide certain operating procedures for the process of this invention which offer particularly advantageous options through the control of the inventory of reactive chloride ions.

Other and more detailed objects and advantages of the present invention will appear from the following description, examples and claims.

BRIEF DESCRIPTION OF THE DRAWINGS

In the accompanying drawings.

FIG. 5 is a tabulation of data showing the effect of chloride ion concentration upon the reduction of cupric chloride to cuprous chloride in the embodiment with separate oxidation and regeneration-purge stages.

FIG. 6 is a tabulation of data showing the effect of chloride ion concentration upon the reduction of cupric chloride to cuprous chloride in the embodiment with combined oxidation and regeneration-purge stages.

FIG. 8 presents a graph of pilot plant data comparing concentrations of sulfate ions in liquors entering and leaving the combined oxidation-regeneration stage with only sodium chloride added to the process liquor, and with potassium chloride added in addition to sodium chloride to the process liquor.

DESCRIPTION OF THE INVENTION

Figure 1:
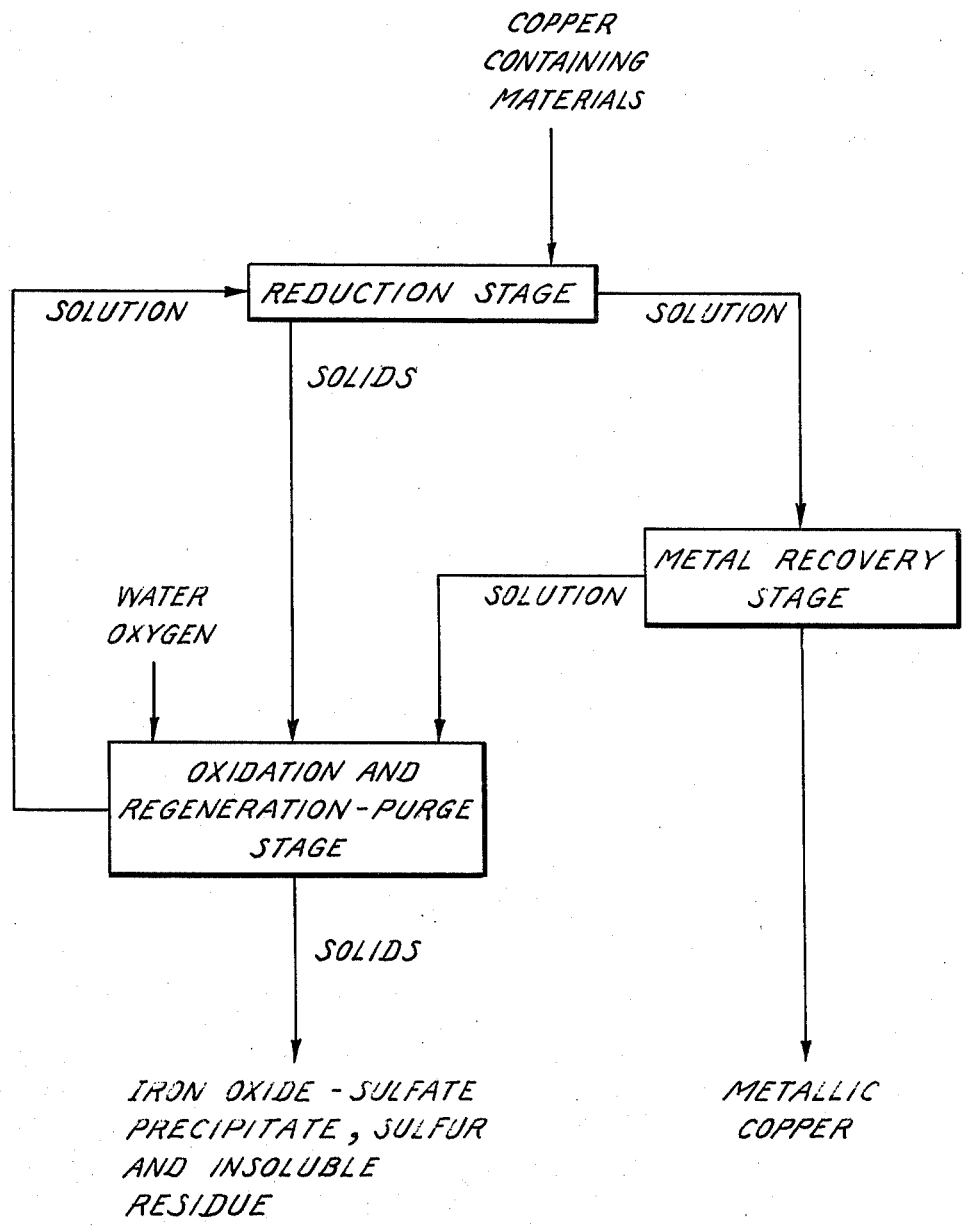
FIG. 1 presents a simplified flow diagram of the process of this invention wherein the oxidation and regeneration-purge stages are combined.

In the said copending application disclosure is made of the option to operate the Regeneration-Purge Stage and the Oxidation Stage either separately or combined. The combined operation procedure provides for the oxidation stage reaction to be conducted in the presence of oxygen, which is an established requirement for the regeneration-purge stage. Under this procedure the reaction of chalcopyrite, in contact with the raffinate liquor from the electrolysis stage, in the presence of oxygen, involves the continuing oxidation of the reaction liquor, specifically: the oxidation of cuprous chloride to cupric chloride and ferrous chloride to ferric chloride as the available reactive chloride ion inventory in the reaction solution permits. To the extent that the inventory of reactive chloride ion is deficient to accommodate the conversion of all the iron to ferric chloride, ferric hydrate will be precipitated.

This is illustrated by the following chemical reactions.

Reduction Stage:

$$2CuFeS_2 + 3CuCl_2 \longrightarrow 4CuCl + FeCl_2 + 2S + CuFeS_2$$

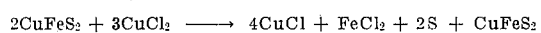

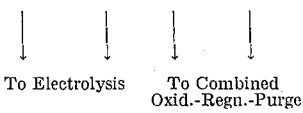

To Electrolysis  To Combined Oxid.-Regn.-Purge

Electrolysis Stage:

$$4CuCl + FeCl_2 \longrightarrow 2Cu + 2CuCl_2 + FeCl_2$$

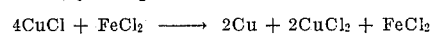

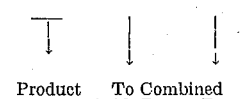

Product  To Combined Oxid.-Regen.-Purge

Combined Oxidation, Regeneration-Purge Stage:

$$CuFeS_2 + 2S + 2CuCl_2 + FeCl_2 + 3/2\ O_2 + 3H_2O \longrightarrow$$
$$3CuCl_2 + 2Fe(OH)_3 + 4S$$

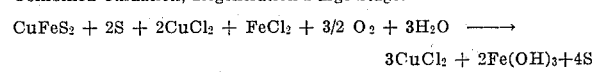

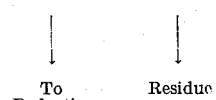

To Reduction  Residue

Thus, the availability of oxygen to the final dissolution reaction, as provided in the combined oxidation and regeneration-purge procedure, offers in addition to cupric chloride the benefit of the higher reactability of ferric chloride and its higher oxidizing power during the course of the reaction to assure the desire maximum possible solubilization of the chalcopyrite. The residue is shown in the simplified equation as ferric hydroxide, but in the preferred embodiment it can be in the form of jarosite.

At the same time, through the control of the reactive chloride ion inventory in the process liquor the ultimate iron concentration in the reacted liquor can be allowed to approach zero for the benefit of the electrolysis stage. However, it is preferred to provide for some minimal residual iron to remain present in the fully reacted liquor as ferric chloride in order to assure that all the reacted copper is present in solution as cupric chloride. This provision for additional reactive chloride ion in the process liquor is illustrated by the addition of the following reaction equations to the process equations previously presented:

Reduction Stage:

$$2CuFeS_2 + 3CuCl_2 \longrightarrow 4CuCl + FeCl_2 + 2S + CuFeS_2$$

$$0.1CuFeS_2 + 0.3FeCl_3 \longrightarrow 0.1Cu + 0.4FeCl_2 + 0.2S$$

$$2.1CuFeS_2 + 3CuCl_2 + 0.3FeCl_3 \longrightarrow 4.1CuCl + 1.4FeCl_2 + 2.2S + CuFeS_2$$

Electrolysis Stage:

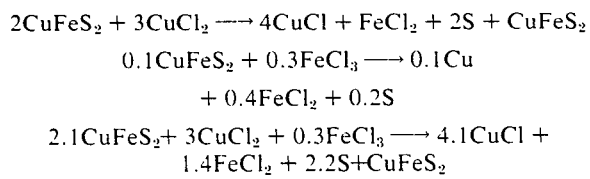

Combined Oxidation, Regeneration-Purge Stage:

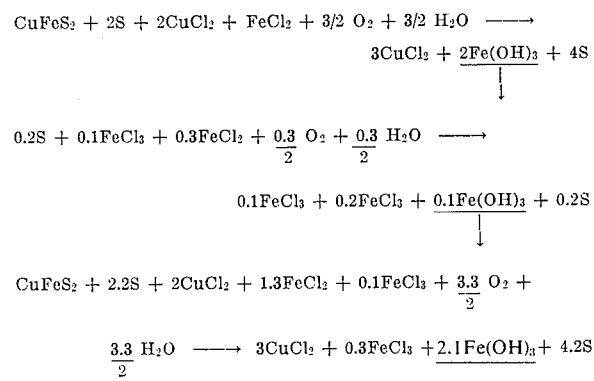

It should be observed that the provision for minimal residual iron content in the finally reacted combined oxidation regeneration-purge stage liquor, as $FeCl_3$, for the sake of assurance that all copper in the solution is cupric chloride, has a compensating effect on electrolysis: the copper dissolved by this residual ferric chloride from the process feed solids to the reduction stage when precipitated at the cathode in the electrolysis stage will occasion the regeneration of the stoichiometrically equivalent ferric chloride in the anolyte. It will be noted that this amounts to one-third of the ferric chloride originally present in the aforesaid combined oxidation regeneration-purge stage reacted liquor.

The means is thus revealed whereby the "combined" procedure offers the opportunity to provide the leaching power of ferric chloride (to assure the maximum solubilization of chalcopyrite) and at the same time achieve the desirable limitation of the iron content of the electrolyte through control of the available reactive chloride ion inventory in the process liquor.

It should be noted that the combined oxidation regeneration-purge procedure remains consistent with the basic premise of our copending application which provides for an oxidation stage, in which the higher oxidizing power of ferric chloride is made available in addition to cupric chloride to assure maximum dissolution power for chalcopyrite, to function in conjunction with the reduction stage, in which the reacted liquor from the oxidation stage is contacted with raw process feed solids, (in stoichiometric excess) whereby the cupric chloride is substantially reduced to cuprous chloride in preparation for electrolysis. The teaching of this "combined" procedure includes the revelation that the simultaneous oxidation regeneration-purge reaction provides for the controlled reduction of the iron content of the reacted liquor to approach zero. By this means the iron content of the feed solution to electrolysis can be limited essentially to that dissolved in the reduction stage only, which contributes favorably toward the quality of the electrolytic copper product.

Additionally, the combined oxidation regeneration-purge procedure offers the advantage of precipitating the jarositic iron hyrate and other compounds associated with the regeneration-purge reaction in the presence of the residual undissolved solids, which tends to reduce and limit the tendency for scaling process equipment:

a. The irregular surface area of the solids particles, grossly larger in aggregate as compared with the contacted smooth surfaces of the equipment, offers preferentially attractive sites for crystallization of the precipitated compounds.

b. The presence of the solids in the system provides abrasive action tending to remove scale from equipment surfaces.

The combining of the oxidation and regeneration-purge stage offers the additional advantages for production operations of further simplifying the process and reducing the equipment requirements.

In the referenced copending application disclosure is made of the extraordinarily beneficial effects of maintaining a desirable total chloride ion concentration in the process liquor by augmenting the reactive chloride ion inventory of the process liquor through the addition thereto of a "suitable saline metal chloride such as sodium chloride, potassium chloride, magnesium chloride or any mixture thereof." These beneficial effects which were discussed in our copending application with respect to sodium chloride, are summarized as follows:

1. Increases the solubility of cuprous chloride.
2. Retards the secondary reaction which results in the loss of copper from solution in the reduction stage, (step A), thus permitting an increased reduction achievement.
3. Enhances the solubilization of copper in the oxidation stage.
4. Retards the oxidation of sulfur to sulfate ions.
5. Protects against the atmospheric reoxidation of cuprous chloride during the handling of the process solution from the reduction stage through the metal recovery stage.

6. Provides a favorable influence on the quality of the electrolytic copper product.

It has been previously noted that associated with the combined oxidation regeneration-purge operating procedure a significant reduction in the iron also reduces the total chloride ion concentration of the process liquor. In accordance with the teaching of the said copending application, the total chloride concentration should be maintained at the desired level by the addition of a suitable saline metal chloride such as "sodium chloride, potassium chloride, magnesium chloride and mixtures thereof."

Figure 2:
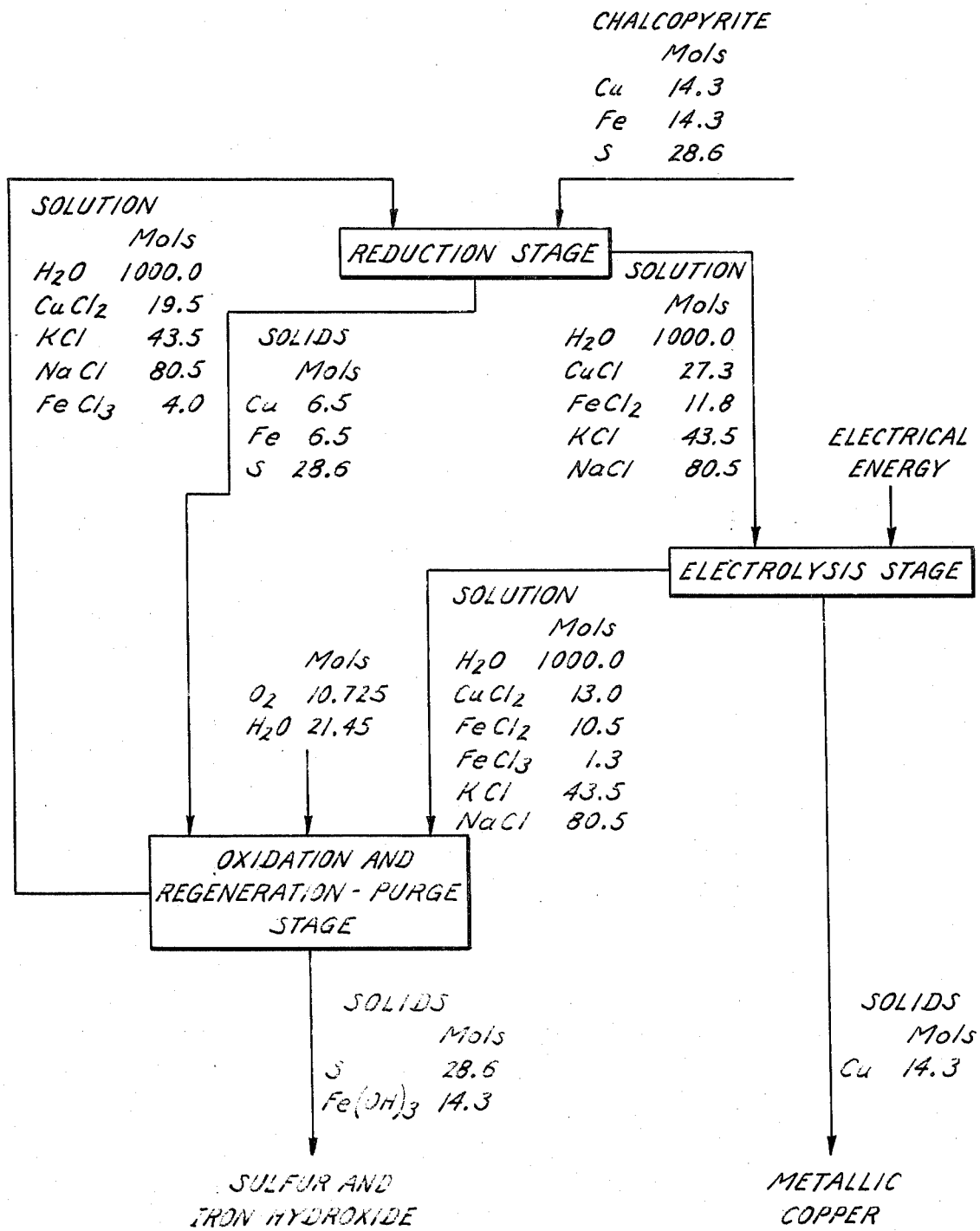
FIG. 2 diagrammatically presents a stoichiometric molar balance to illustrate the basic chemistry of the process of FIG. 1 applied to chalcopyrite.

Laboratory and pilot plant operating experience with the oxidation and regeneration-purge stages conducted separately, together with the associated iron concentration in the process liquor, as illustrated in FIG. 2 of the said copending application, established that the desirable total chloride ion concentration in the process liquor could be achieved under these conditions by the addition of the saline metal chloride, sodium chloride, alone, at near saturation. This was considered an acceptable practice and was presented in the "preferred embodiment" of the said copending application, since sodium chloride is normally the most economically available of the saline metal chlorides.

The continuing laboratory and pilot plant operating experience, in which the oxidation and regeneration-purge stages were combined and conducted simultaneously, in accordance with the preferred procedures illustrated by the chemical reactions presented earlier in this specification, have established that the desirable total chloride ion concentration cannot be satisfactorily achieved by the addition of the saline metal chloride, sodium chloride, alone, at near saturation. However, the additional chloride ion required to offset the reduction in chloride ion associated with the lower iron concentration in the process liquor can be achieved by the substitution of magnesium chloride for sodium chloride as the saline metal chloride additive, or preferably by the addition of potassium chloride to the process liquor, already near saturation with sodium chloride, to a concentration representing near saturation for the combination of these two saline metal chloride salts in the process liquor.

The use of potassium chloride in combination with sodium chloride as the saline metal chloride additive to the process liquor is preferred, based on the discovery that to the extent potassium ion (together with iron) is available in the process liquor practically all sulfate ion is precipitated therefrom as potassium iron jarosite in the regeneration-purge reaction. This is an important benefit in the control of scaling of the process equipment.

The chemistry of the process liquor with respect to chloride ion concentration in relation to the optional operating modes is illustrated in the accompanying FIGS. 5 and 6.

The tabulations set forth the pertinent chemistry of the Reduction Stage reaction for the process operating mode in which the Oxidation and Regeneration-Purge stages are maintained separate, (in accordance with FIG. 2 in the copending application), for comparison with the combined operating mode, which is the subject for further examination and development in this continuation-in-part.

The chemical structure for the reaction system is indicated in mols per 1000 mols of water, as well as in weight percent.

The reaction time was held constant at one hour at constant temperature, 107°C, in an agitated closed vessel equipped with reflux condenser.

It will be noted that data are presented for progressively varying levels of total chloride ion, ($Cl^-$), in the feed liquor to the Reduction Stage for each operating mode for the process:

1. Separated Oxidation Regeneration-Purge Stages
   a. 175 mols $Cl^-$ as established by maintaining the sodium chloride concentration at 71 mols.
   b. 155 mols $Cl^-$ resulting from a reduction in the sodium chloride concentration to 51 mols, for effect.
   c. 140 mols $Cl^-$ resulting from a reduction in the sodium chloride concentration to 36 mols, for effect.
   d. 125 mols $Cl^-$ resulting from a reduction in the soduim chloride concentration to 21 mols, for effect.
2. Combined Oxidation Regeneration-Purge Stages
   a. 122 mols $Cl^-$ resulting from the reduction of the iron chloride concentration from 32.5 mols $FeCl_2$ to 4.0 mols $FeCl_3$.
   b. 140 mols $Cl^-$ resulting from increasing the sodium chloride concentration from 71.0 mols to 80.5, (very near saturation), and introducing 8.5 mols of potassium chloride.
   c. 155 mols $Cl^-$ resulting from increasing the sodium chloride concentration from 71.0 mols to 80.5, (very near saturation), and introducing 23.5 mols of potassium chloride.
   d. 175 mols $Cl^-$ resulting from increasing the sodium chloride concentration from 71.0 mols to 80.5, (very near saturation), and introducing 43.5 mols of potassium chloride.
   e. 175 mols $Cl^-$ established by introducing magnesium chloride, alone, as the saline metal chloride at 62.0 mols per 1000 mols water.

It will be observed that with the reduction in total $Cl^-$ concentration under the above outlined conditions the reduction from 100 percent cupric ions in the feed liquor to cuprous ions in the reacted liquor varied at the extremes from 97.3 – 99.7% at 175 mols $Cl^-$ to 75.0 – 76.9% at 122 – 125 mols $Cl^-$. No loss of copper from solution by secondary reaction was observed even at the very high level of reduction to cuprous ion that was achieved.

Summarizing, the selected data presented in the accompanying tables shown in FIGS. 5 and 6 illustrate the important influence of total chloride ion concentration on the Reduction Stage, (step A), reaction of raw copper sulfide concentrates for the reduction of cupric chloride to cuprous chloride. For the operating mode in which the Oxidation and Regeneration-Purge Stages are maintained separate the total chloride ion concentration was varied by adjusting the sodium chloride, NaCl, concentration. For the combined operating mode in which the iron concentration was lowered the compensating addition of chloride ion was achieved, as indicated, by substitution of magnesium chloride, $MgCl_2$, for NaCl, and alternatively by the introduction of potassium chloride, KCl, as required to establish the desired total chloride ion concentration above that achievable with NaCl, alone, due to the limitation of the solubility of NaCl.

Figure 7:
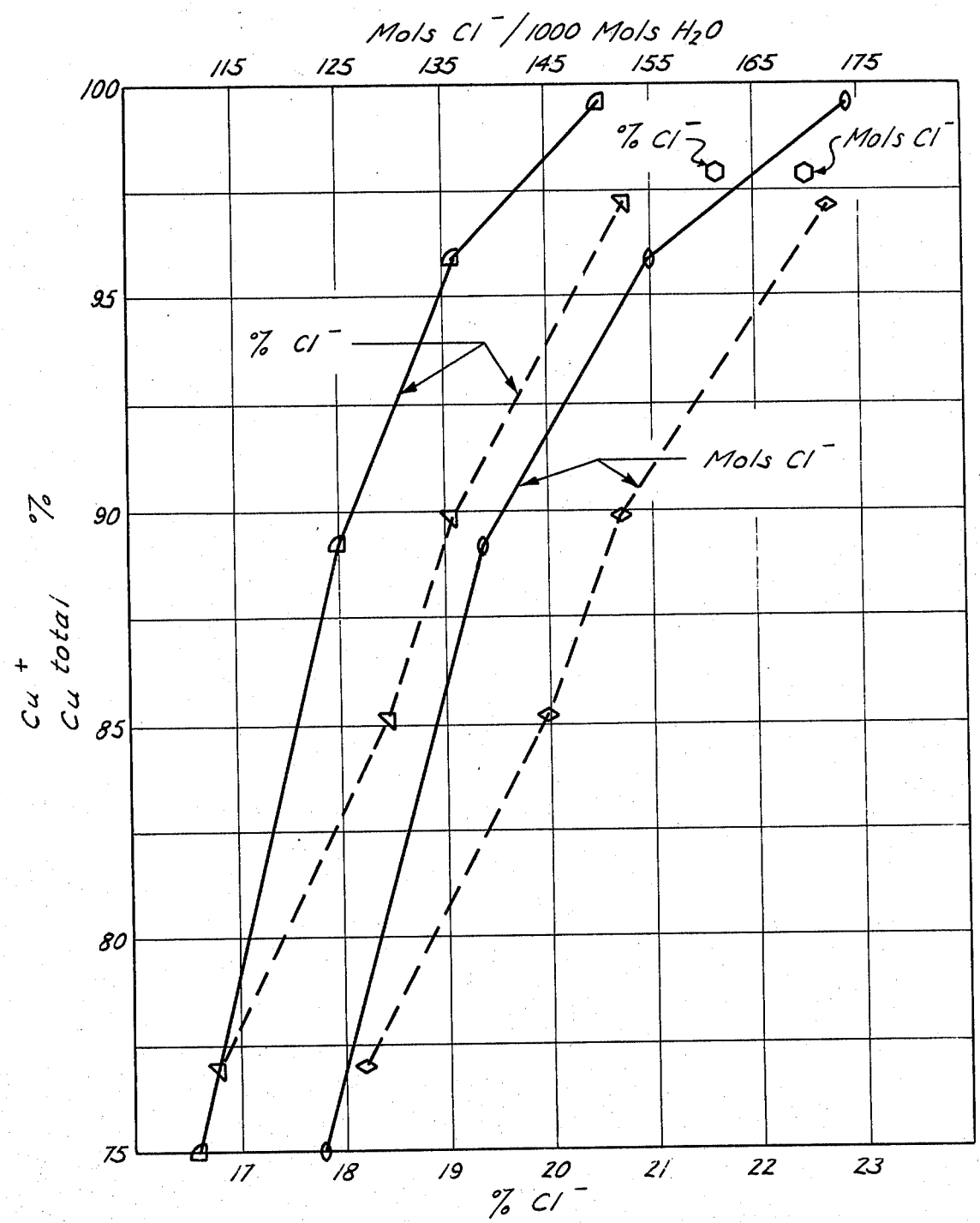
FIG. 7 is a graph showing the effect of chloride ion concentration upon the reduction of cupric chloride to cuprous chloride in the reduction stage.

The information of the tables shown in FIGS. 5 and 6 is also presented graphically in the accompanying FIG. 7.

The progressive relationship between the total chloride ion (Cl⁻) concentration and the accompanying reduction of cupric to cuprous chloride in the reacted liquor is depicted for the range of total chloride ion concentration expressed as 122 to 175 mols Cl⁻ per 1000 mols $H_2O$, and alternatively expressed as 16 to 21% Cl⁻.

It will be observed that in the combined oxidation and regeneration-purge mode the chloride system, low in iron, and augmented with sodium and potassium chloride, delineated on the graph by the solid lines displays a more favorable environment for the reduction of cupric to cuprous than that in the separate oxidation and regeneration-purge mode which is a high iron chloride system augmented by sodium chloride, alone, (delineated on the graph by the dotted lines). This revelation is a further basis of the expressed preference for the inclusion of potassium chloride in the addition of saline metal chloride to the system.

The basic chemistry for the preferred embodiment of the process operating mode in which the Oxidation and Regeneration-Purge Stages are combined is illustrated by the stoichiometric molar balance of FIG. 2, as applied to chalcopyrite.

The important discovery, previously described herein, that to the extent potassium ion (together with iron) is available in the process liquor practically all sulfate ion is precipitated therefrom as potassium iron jarosite in the regeneration-purge reaction is illustrated by the selected pilot plant operating data presented graphically in FIG. 8. It will be observed that the level of sulfate ion in the post oxidation liquor in the presence of the sodium chloride, alone, as the saline metal chloride additive, drops precipitously to near zero upon the introduction of potassium chloride to the process liquor in the system.

DESCRIPTION OF THE PREFERRED EMBODIMENTS

The simplified basic process for the treatment of copper-containing materials wherein the oxidation and regeneration-purge stages are combined will readily be understood from the diagram of FIG. 1, and the basic chemistry is illustrated by the stoichiometric molar balance of FIG. 2, as applied to chalcopyrite. For a more complete description of a preferred embodiment, however, reference should be made to FIG. 3 and the following illustrative description.

Figure 3:
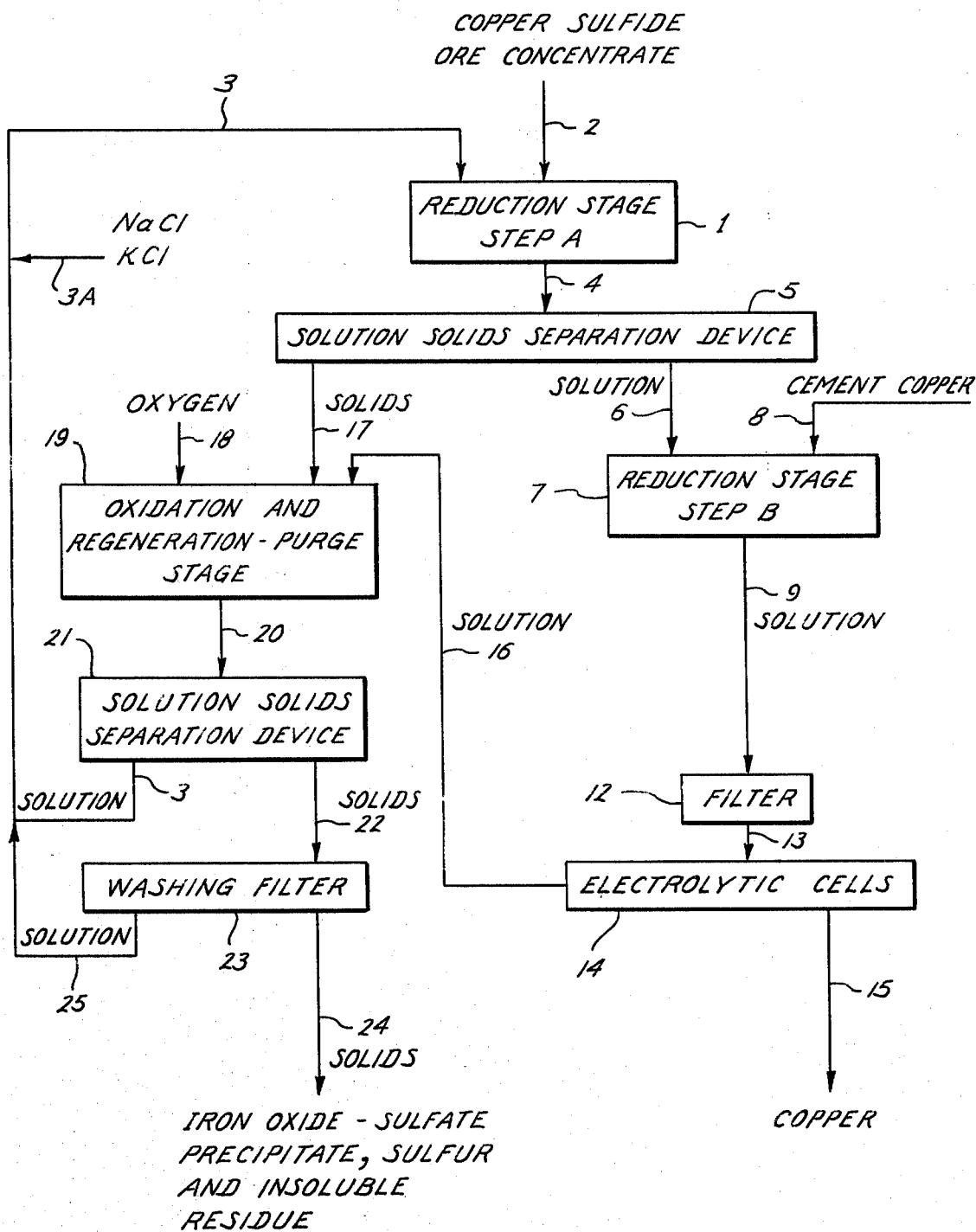
FIG. 3 presents a flow diagram of one embodiment of the process according to this invention wherein the oxidation and regeneration-purge stages are combined.

In the treatment of copper sulfide ore concentrates containing principally chalcopyrite, the fresh ore concentrates are added to reduction stage 1, step A, through line 2, (FIG. 3). As used herein, "fresh" or "raw" refers to copper-containing materials not previously reacted with any reagent in the process. Cupric chloride, sodium chloride and potassium chloride are introduced into reduction stage 1, step A, through line 3. Makeup of sodium chloride and potassium chloride is introduced into line 3 through line 3A.

In the reduction stage 1, step A, which is essentially closed to the atmosphere, the cupric chloride in the solution is substantially reduced to cuprous chloride by reaction with the sulfide ore concentrates at near atmospheric boiling temperature, about 107°C. The partially reacted sulfide ore concentrates as well as the solution containing some unreduced cupric chloride, the cuprous chloride, ferrous chloride sodium chloride and potassium chloride are passed through line 4 to separation device 5, where the solids are separated from the solution by gravity sedimentation.

The solution from separator 5 containing cupric chloride, cuprous chloride, ferrous chloride, sodium chloride and potassium chloride is then passed through line 6 to reduction stage 7, step B, into which is also passed cement copper through line 8. The cement copper is used to reduce substantially all the remaining cupric chloride to cuprous chloride at near atmospheric boiling temperature, about 107°C. concurrently, the cement copper is solubilized in the form of cuprous chloride.

The solution from reduction stage 7, step B, containing cuprous chloride, ferrous chloride, sodium chloride and potassium chloride is removed therefrom through line 9 and enters a suitable filter 12, such as a sand filter, for the removal of any suspended solids.

If a calcium sulfate salt accumulates in the process liquor it can be controlled to an acceptable level by providing a crystallization step for its removal from the system. The filtered electrolyte solution then passes through line 13 and enters into electrolytic cells 14. In these cells cuprous chloride is electrolyzed to deposit metallic copper at the cathodes and to regenerate cupric chloride at the anodes. The metallic copper together with any silver deposited therewith is removed from electrolytic cells 14 at 15.

The solution from the electrolytic cells containing ferrous chloride, sodium chloride and potassium chloride and regenerated cupric chloride is then passed through line 16 to oxidation and regeneration-purge stage 19. Also added to stage 19 through line 17 are the solids, including the partially reacted ore concentrates, from separation device 5. With the reaction temperature maintained at about 140°C and the pressure at about 60 psig, air or oxygen is passed through line 18 into stage 19 wherein the ferrous chloride is oxidised to ferric chloride, with the cupric chloride in the solution acting as a catalyst. Concurrently, the ferric chloride and cupric chloride react with the solids so as to essentially completely dissolve the copper therefrom. The excess iron dissolved into the process solution, sulfate ions and other contaminants present in the system are concurrently precipitated in the form of basic iron oxide and potassium jarosite.

This combined stage is advantageously conducted at elevated temperatures to lower the reaction time required for the oxidation and regeneration-purge reactions. It is believed that at a temperature above the melting point of sulfur but below the temperature at which the viscosity of sulfur rises abruptly, i.e., within the range from about 115°C to about 159°C, the superheated aqueous solution displaces the molten sulfur from the mineral surfaces, thus preventing "blinding" and exposing the minerals to contact by the oxidizing solution. The preferred temperature range is about 140°C to about 150°C. For example laboratory tests conducted in accordance with the above procedure at 140°C and 60 psig, using oxygen, with 60 minutes reaction time, yielded 99.5% dissolution of the copper from copper sulfide ore concentrates, consisting principally of chalcopyrite, and having a typical particle size range.

After cooling to a temperature below atmospheric boiling to prevent uncontrolled flashing, at which temperature the elemental sulfur exists in the solid form, the resultant slurry containing the sulfur, insoluble residue, potassium jarosite precipitate, cupric chloride, ferric chloride, sodium chloride and potassium choride is passed through line 20 into separation device 21. In this device gravity sedimentation is used to separate the insoluble residue, sulfur and potassium jarosite precipitate from the solution containing cupric chloride, ferric chloride, sodium chloride and potassium chloride. This solution is then recycled through line 3 to reducing stage 1, step A. The solids are removed from device 21 through line 22 to a washing filter 23 where substantially all remaining process liquor is displaced. The filtered solids (sulfur, insoluble residue and potassium jarosite precipitate) are removed at 24 and the recovered liquid is added to the solution in line 3 through line 25. The solids can be further treated by conventional methods to remove elemental sulfur, the potassium jarosite precipitate and any insoluble precious metals.

It has been found that conducting the combined stage at atmospheric boiling temperature requires extension of the mean reaction time to 10 or 12 hours to obtain the desired 99% dissolution of copper from typically sized chalcopyrite concentrates. Thus, from an operating standpoint, the mechanical advantage of atmospheric pressure can be obtained at the expense of extending the reaction time.

Through control of the chloride inventory in the process liquor the ultimate iron concentration in the reacted liquor can be allowed to approach zero, to thereby minimize iron in the process liquor and thereby to improve the quality of copper product in the electrolysis stage. However, it is preferred to provide for some residual iron to remain present in the reacted liquor (as ferric chloride), in order to assure that all the reacted copper is present in solution as cupric chloride.

Although one embodiment of this invention has been described in relation to the treatment of copper sulfide ore concentrates comprised principally of chalcopyrite, it has also been found that a mixture of such sulfide ore concentrates and non-sulfide minerals, such as native copper and copper oxides, carbonates, and silicates, can likewise be effectively treated in accordance with the present invention. Accordingly, since substantially all copper ores contain chalcopyrite, and most other copper-containing materials in such ores are more easily solubilized, the process of our invention has the important advantage that practically any copper ore concentrate or any mixture of copper concentrates can be leached on a commercial basis.

Figure 4:
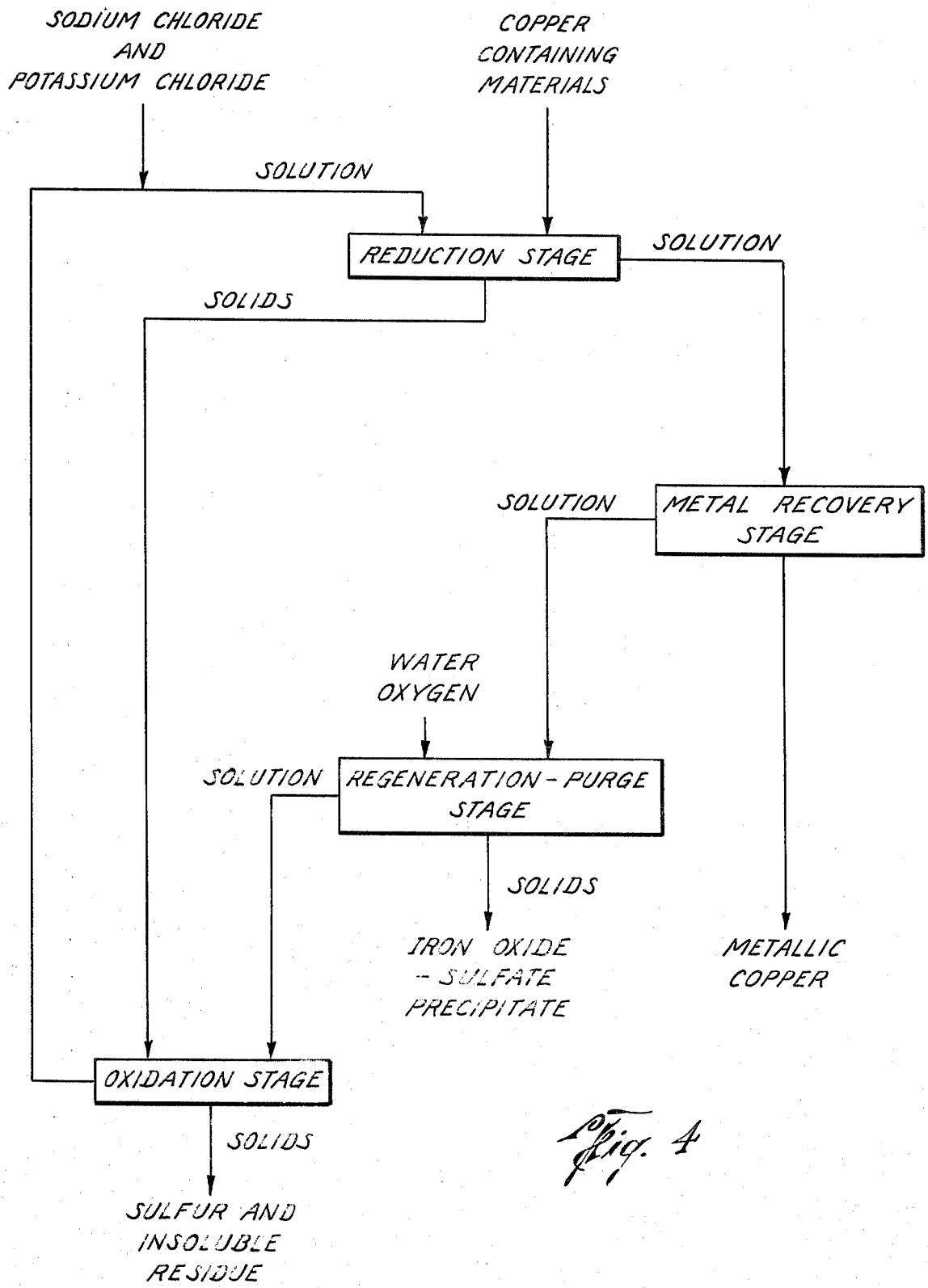
FIG. 4 presents a simplified flow diagram of the process of this invention wherein the oxidation and regeneration-purge stage are separate.

In another embodiment of the present invention as illustrated in the flow diagram of FIG. 4 the use of potassium chloride alone or with sodium chloride has been found advantageous in the process in which the steps of the regeneration-purge stage and the oxidation stage are performed separately. The addition of potassium chloride makes available potassium ion in the process liquor whereby practically all sulfate ion can be precipitated therefrom as potassium jarosite in the regeneration-purge reaction. This is important in the control of scaling in the process equipment.

In reacting cupric chloride from the oxidation stage with fresh chalcopyrite in the reduction stage, we have discovered that the degree of reduction achievable can be limited by a secondary reaction resulting in the loss of copper from solution. We believe on the basis of evidence currently available that a stable form of copper sulfide is precipitated. It has further been discovered that the reaction is temperature sensitive, and that by limiting the temperature to atmospheric boiling, about 107°C, the reduction of cupric chloride that is possible with minimal or no loss of copper from solution can be obtained in about 4 hours' mean reaction time. Thus it will be understood that limiting the temperature of the reduction reaction can limit the reaction rate to an extent that permits practical control of the reaction.

Further reduction of the cupric chloride from the first step of the reduction stage can be achieved with appropriate reducing agents such as sulfur dioxide, sodium sulfite, metallic iron, and material containing metallic copper. To the extent that scrap copper or cement copper is available economically, its use, obviously, would be advantageous in that this copper is upgraded to electrolytic grade copper in the electrolysis stage. In fact, the entire reduction of cupric chloride to cuprous chloride can be accomplished by any of these reducing agents.

In the second step of the reduction stage (also referred to as step B), the temperature at which the reaction is advantageously conducted will vary according to the specific reducing agent used. For example, in using cement copper or metallic iron, a reaction temperature near atmospheric boiling (about 107°C) has been found satisfactory.

In both the oxidation and regeneration-purge stage and the reduction stage, it has been found preferable to conduct the reactions out of contact with the atmosphere to minimize vapor loss, and in the reduction stage to avoid oxidation of cuprous chloride to cupric chloride.

It has been found advantageous to control the temperature of the electrolysis. Increasing temperature increases the electrical conductivity of the electrolyte, and enhances the solubility of the dissolved salts, both of which effects are advantageous; however, the vapor pressure of hydrochloric acid in the electrolyte also increases, which is disadvantageous. Laboratory experimentation and also experimental pilot plant operations have been indicated that a temperature range of about 30°C to about 60°C is acceptable for electrolysis; however, a temperature of about 55°C is preferred.

It has also been found preferable to clarify the pregnant solution before it is passed into the electrolytic cells. This is done to remove any small particles still remaining in the solution which could adversely affect the quality of the metallic copper produced at the cathodes in the electrolytic cells. This can be accomplished by any suitable apparatus, such as a sand filter.

The electrolysis of the pregnant (feed) solution, which contains cuprous chloride and ferrous chloride, results in the transfer of copper ions to the cathode for the production of metallic copper and the simultaneous transfer of chloride ions to the anode to be released in the presence of the anolyte solution, thereby oxidizing the cuprous chloride therein to cupric chloride. In the separate oxidation and regeneration-purge mode the process is preferably controlled so that the copper electrolytically precipitatated amounts to no more than about one-half the cuprous copper content of the pregnant solution feed to electrolysis.

However, as previously noted, in the combined oxidation and regeneration-purge mode, it is desirable that a small amount of ferric chloride be introduced into the reduction stage with the cupric chloride from the oxidation stage. In this case, the amount of copper removed in the electrolytic cell should exceed one-half of the cuprous content of the pregnant liquor by the amount solubilized by ferric chloride in the reduction stage. Also an amount of ferric chloride equal to the amount reduced to ferrous chloride in the reduction stage will be oxidized to ferric chloride in the anode compartment of the cell.

The desirable characteristics of diaphrams that can be used in the electrolytic cells are that they be substantially inert to the solution and minimal resistance to hydraulic flow of the solution and minimal electrical resistance. Available materials to meet these requirements include teflon, polypropylene, polyethylene, and polyacrylic, all of suitable texture, including felted, woven, needled, or gas-expanded, processed as required to establish desirable limited permeability to solution flow, together with minimal electrical resistance. Other available materials include membranes used in the electrical de-salination of water, such as chlorosulfonated ployethylene sheets.

The relative levels of solution in the catholyte compartment and anolyte compartment of the electrolytic cell are controlled by weir-type arrangements to maintain a hydraulic gradient from the catholyte compartment to the anolyte compartment in order to preclude the counterflow through the diaphrams of anolyte solution into the catholyte compartment. The anolyte solution contains cupric chloride. If this solution were permitted to back flow into the catholyte compartment, it would tend to re-dissolve copper from the cathode which would impair electrical efficiency.

The practice of this invention is not limited to the use of any special equipment. The stages and process steps described herein may be conducted on a batch or continuous basis and in any appropriate conventional equipment, including for example, reactors, containers and vessels which may be made open or closed to the atmosphere by conventional means. Moreover, each stage or step as described herein may be conducted in one or more reactors, vessels or containers. Further, the use of available compartmented, divided or segmented units of equipment is within the contemplation of this invention.

We claim:

1. A hydrometallurgical process for the production of metallic copper comprising a reduction stage in which materials containing copper-iron sulfide ore concentrates are introduced into an aqueous chloride solution containing cupric chloride to solubilize part of the copper in said materials and reduce a substantial portion of the cupric chloride to cuprous chloride, the total chloride ion concentration relative to the water content of said chloride solution being maintained at the desired level to minimize precipitation of cuprous chloride in said solution by the addition of a saline metal chloride compound selected from the group consisting of potassium chloride, magnesium chloride, a mixture of magnesium chloride and potassium chloride; or a mixture of any of the foregoing with sodium chloride; a copper recovery stage in which metallic copper is recovered by reduction of the cuprous chloride in the solution from the reduction stage; and in which cupric chloride is regenerated; and an oxidation stage combined with a regeneration-purge stage to retard scaling of equipment in which the raffinate from the copper recovery stage is reacted with oxygen to form a solution containing ferric chloride which concurrently oxidizes the unreacted materials from the reduction stage to solubilize substantially all the remaining copper in the materials, thereby forming a solution containing cupric chloride and ferric chloride, with the concurrent precipitation, by reaction of ferrous chloride with oxygen and hydrolysis, of compounds including those having the iron-sulfate ratios of jarosite, to thereby remove a substantial portion of the iron as well as sulfate ions and other impurities from the chloride solution; and recycling the chloride solution containing cupric chloride to the reduction stage.

2. The process of claim 1 in which the total chloride ion concentration is maintained at a level which will increase the degree of reduction of cupric chloride to cuprous chloride in the reduction stage with minimal loss of copper from solution.

3. The process of claim 2 in which the chloride ion concentration is maintained near the maximum permitted by the solubility of the saline metal chlorides in the process solution.

4. The process of claim 3 in which potassium chloride is included in the saline metal chloride addition.

5. The process of claim 4 in which potassium chloride is included in the saline metal chloride addition in the amount required to achieve the desired purge of as much as substantially all the sulfate ion by precipitation from the solution.

6. The process of claim 4 in which sodium chloride is selected as the saline metal chloride with which potassium chloride is included.

7. The process of claim 1 in which the residual iron concentration in the combined oxidation and regeneration-purge stage finally reacted liquor is limited by controlling the inventory of reactive chloride ion in the process liquor.

8. The process of claim 1 in which the removal of the iron from the chloride solution in the combined oxidation and regeneration-purge stage is limited so as to retain sufficient iron to assure that all copper chloride is present as cupric chloride in the finally reacted liquor.

9. The process of claim 8 in which metallic copper is recovered by electrolysis in the copper recovery stage and the amount recovered is maintained equivalent to the copper dissolved into the process liquor, with oxidation in the anolyte of the cuprous chloride to cupric chloride, and also oxidation in the anolyte of ferrous chloride to ferric chloride in an amount equivalent to one-third of the residual ferric chloride present in the combined oxidation and regeneration-purge stage finally reacted liquor.

10. A hydrometallurgical process for the production of metallic copper from copper sulfide ore concentrates containing a substantial proportion of chalcopyrite, comprising a reduction stage in which the ore concentrates are introduced into an aqueous chloride solution containing cupric chloride to solubilize part of the copper in said materials and reduce substantially all of the cupric chloride to cuprous chloride, the total chloride ion concentration of said chloride solution relative to the water content thereof being maintained, by the addition of a saline metal chloride compound selected from the group consisting of potassium chloride, magnesium chloride, a mixture of any of the foregoing with sodium chloride, in an amount near the maximum permitted by the solubility of the saline metal chlorides in said chloride solution; a copper recovery stage in which metallic copper is recovered by electrolyzing in electrolytic cells the cuprous chloride in the solution from the reduction stage to produce metallic copper in the cathode compartment and to regenerate the cupric chloride in the anode compartment; and an oxidation stage combined with a regeneration-purge stage to retard scaling of equipment in which the raffinate from the copper recovery stage is reacted with oxygen to form a solution containing ferric chloride which concurrently oxidizes the unreacted ore concentrates from the reduction stage to solubilize substantially all the remaining copper in said concentrates, thereby forming a solution containing cupric chloride and minimal residual ferric chloride, with the concurrent precipitation by hydrolysis, of compounds including those having the ironsulfate ratios of jarosite, to thereby remove the excess iron as well as excess sulfate ions and other impurities from the chloride solution; and recycling the chloride solution containing cupric chloride and minimal ferric chloride to the reduction stage.

11. The process of claim 10 in which the metallic copper produced at the cathodes in the electrolysis stage is maintained substantially equivalent to the copper dissolved into the chloride solution and will therefore be accompanied by the oxidation of the cuprous chloride to cupric chloride in the anolyte, and also oxidation of ferrous chloride to ferric chloride in the anolyte in an amount equivalent to one-third of the residual ferric chloride present in the combined oxidation and regeneration-purge stage finally reacted liquor.

12. A hydrometallurgical process for the production of metallic copper comprising:
  A. Reacting at about 107°C materials containing principally fresh chalcopyrite ore concentrates with a cupric chloride solution containing a limited amount of ferric chloride, to thereby reduce a substantial portion of the cupric chloride to cuprous chloride and to produce ferrous chloride, said cupric chloride solution containing sufficient sodium chloride and potassium chloride to maintain the total chloride concentration, related to water, near the maximum permitted by the solubility of the sodium and potassium chlorides in the process solution.
  B. Electrolyzing in electrolytic cells the cuprous chloride in the solution from step A to produce metallic copper in the cathode compartment and to regenerate the cupric chloride in the anode compartment;
  C. Reacting with oxygen at a temperature between about 107°C and about 159°C and at a pressure between atmospheric pressure and about 60 psig the ferrous chloride in the spent electrolyte in the presence of regenerated cupric chloride to regenerate ferric chloride and cupric chloride which concurrently oxidize the unreacted ore concentrates from step A to solubilize substantially all the remaining copper in the ore concentrates, thereby forming a solution containing cupric chloride and some limited ferric chloride, with the concurrent precipitation, by hydrolysis, of excess iron as potassium jarosite, to thereby remove excess iron and excess sulfate ions from the cupric chloride solution as well as removing other impurities; and
  D. Recycling the cupric chloride solution containing a limited amount of iron chloride from step C to step A.

13. A hydrometallurgical process for the production of metallic copper comprising an oxidation stage in which materials containing copper-iron sulfide ore concentrates are oxidized in a solution containing iron chloride and cupric chloride until there is substantial solubilization of the copper content of said materials in the form of cupric chloride, a reduction stage separate from the oxidation stage in which at least a substantial portion of the cupric chloride in the solution from the oxidation stage is reduced to cuprous chloride, said cupric chloride solution containing sufficient sodium chloride and potassium chloride to maintain the total chloride concentration, related to water, near the maximum permitted by the solubility of the sodium and potassium chlorides in the process solution; an electrolysis stage in which metallic copper is recovered and cupric chloride is regenerated by electrolysis of the cuprous chloride solution from the reduction stage, and a regeneration-purge stage separate from the reduction and electrolysis stages in which the ferrous chloride in the solution from the electrolysis stage is reacted with oxygen in the presence of the regenerated cupric chloride to regenerate the ferric chloride required in the oxidation stage and to precipitate, by hydrolysis, compounds including potassium jarosite to thereby control the concentration in the process solution of iron as well as sulfate ions and remove other impurities from the solution.

14. The process of claim 13 in which the total chloride ion concentration is maintained at a level which will increase the degree of reduction of cupric chloride to cuprous chloride in the reduction stage with minimal loss of copper from solution.

15. The process of claim 13 in which the desired purge of the excess sulfate ion by precipitation is achieved by controlling the amount of potassium chloride which is included in the process solution.

16. The process of claim 13 in which the desired purge of excess iron by precipitation is achieved by controlling the inventory of available reactive chloride ions in the process solution.

* * * * *

UNITED STATES PATENT OFFICE
CERTIFICATE OF CORRECTION

Patent No. 3,879,272           Dated April 22, 1973

Inventor(s) George E. Atwood and Charles H. Curtis

It is certified that error appears in the above-identified patent and that said Letters Patent are hereby corrected as shown below:

Column 1, line 23, "cypric" should be -- cupric --

Column 3, line 3, "desire"should read -- desired --

Column 3, line 23, "0.1 Cu" should read -- 0.1 CuCl --

Column 4, line 43, "stage" should be -- stages --

Column 7, line 66, a comma (,) should appear after "ferrous chloride"

Column 8, line 35, "oxidised" should be -- oxidized --

Column 10, line 64, "equal to" should read -- stoichiometrically equivalent to the copper electrolyzed and equal to one-third of --

Column 11, line 10, "ployethylene" should be -- polyethylene --

Column 13, line 6, "ironsulfate" should be -- iron-sulfate --

Signed and Sealed this thirtieth Day of September 1975

[SEAL]

Attest:

RUTH C. MASON
Attesting Officer

C. MARSHALL DANN
Commissioner of Patents and Trademarks